(No Model.)
O. D. GORDON & J. C. LUCIA.
SAW MILL DOG.
No. 391,603. Patented Oct. 23, 1888.
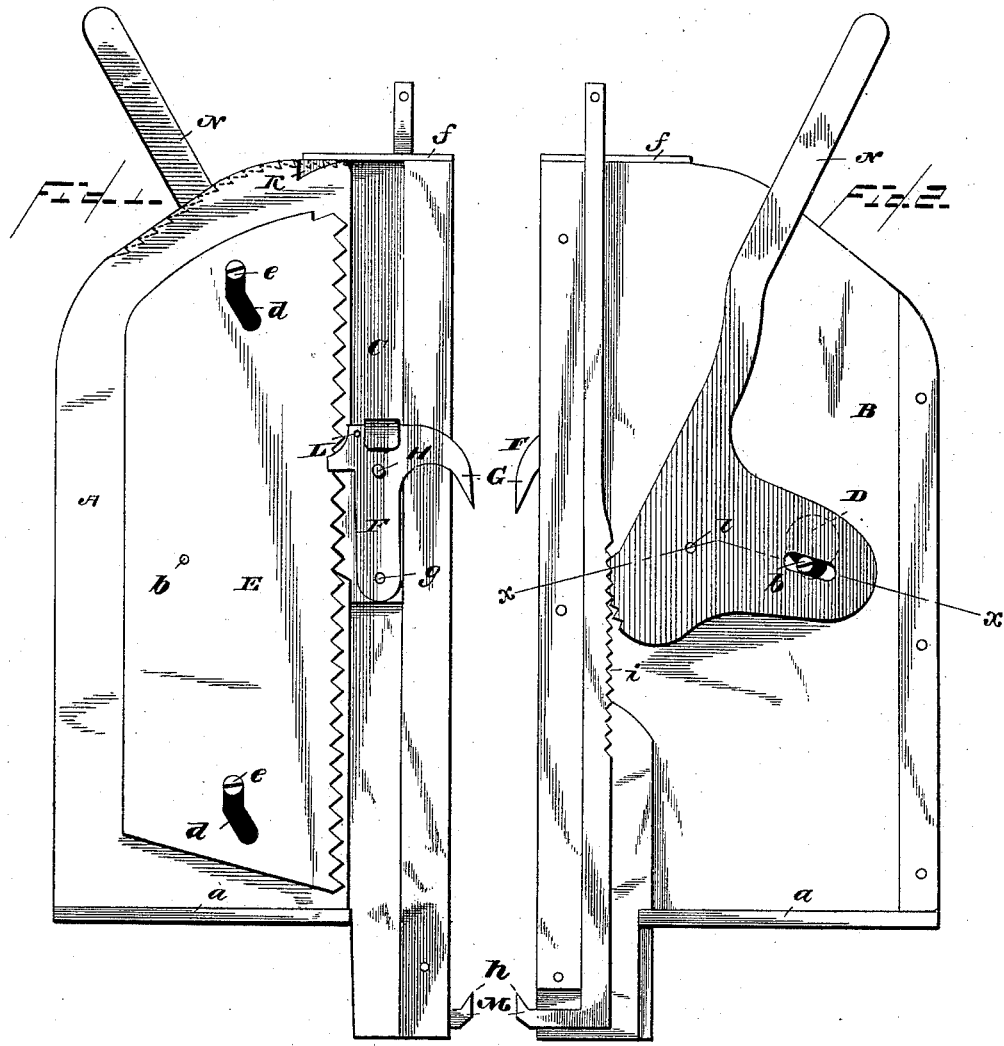
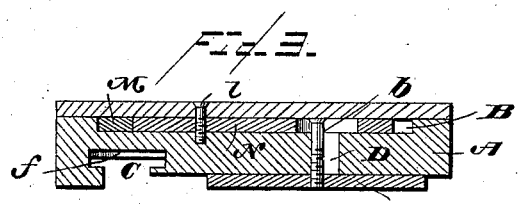
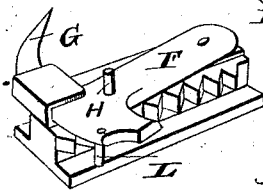
WITNESSES.
INVENTORS.
O. D. Gordon.
J. C. Lucia.
By James J. Sheehy,
Attorney.

UNITED STATES PATENT OFFICE.

ORMANDO D. GORDON AND JOSEPH C. LUCIA, OF WEST BURKE, VERMONT.

SAW-MILL DOG.

SPECIFICATION forming part of Letters Patent No. 391,603, dated October 23, 1888.

Application filed May 24, 1888. Serial No. 274,926. (No model.)

*To all whom it may concern:*

Be it known that we, ORMANDO D. GORDON and JOSEPH C. LUCIA, citizens of the United States, residing at West Burke, in the county of Caledonia and State of Vermont, have invented certain new and useful Improvements in Saw-Mill Dogs; and we do declare the following to be a full, clear, and exact description of the invention, such as will enable others skilled in the art to which it appertains to make and use the same.

This invention has relation to improvements in saw-mill dogs; and it consists in the combination of devices whereby the dogs may be readily adjusted to engage the log.

It also consists in the combination, with a toothed slide, of a pivoted dog and means for locking the dog, and also locking the slide to the main frame or plate.

It further consists in the combination, with a grooved plate, of a toothed plate having inclined or V-shaped slots, and a toothed slide having a dog and a lever for manipulating the slide-plate.

It further consists in the combination, with a recessed plate having a grooved way, of vertically-movable dogs, a toothed and slotted plate, and a pivoted hand-lever adapted to effect an engagement with the dogs.

It further consists in the combination, with a grooved plate, of a toothed slide-plate having inclined slots, a sliding rack carrying a pivoted dog which has a locking-pin, and a manipulating-handle.

The invention will be more fully understood from the following description and claims, when taken in connection with the annexed drawings, in which—

Figure 1 is a side elevation showing the parts engaged and the dogs in a position to hold the log. Fig. 2 is an elevation of the opposite side with the covering-plate removed. Fig. 3 is a cross-sectional view taken on the lines x x of Fig. 2, and Fig. 4 is a perspective view of the toothed slide-block carrying the upper dog.

Referring by letter to the said drawings, A indicates a vertical plate or upright, which is provided at its lower end and on opposite sides with horizontal flanges a, whereby the said upright may be firmly secured to the head-block of a saw-mill carriage, there being one of my improved devices employed on each end thereof. This vertical plate or standard is recessed on one of its flat sides, as shown at B, of a sufficient depth to receive the lower dog and the operating-lever, as more fully shown in Fig. 2, and its opposite side, near its forward edge, is provided with a vertical groove, C, for the reception of a toothed slide-block carrying the upper dog, as will be presently explained. This vertical plate or standard is furthermore provided at a suitable point with a transversely-arranged slot, D, as shown in dotted lines, Fig. 2, for the passage of the stud $b$, which connects the operating hand-lever with a toothed slide-plate, E, on the opposite side of the standard.

The slide-plate E is provided near opposite ends with V-shaped slots $d$, or slots having inclined walls, and the said plate is held to the standard and guided in a vertically-vibratory manner by means of screws or headed holding devices $e$, as shown. By reference to Fig. 1 of the drawings it will be observed that this slide-plate is allowed to approach and recede from the forward or adjacent edge of the grooved guide in the standard, so that it may be thrown in and out of engagement with the movable toothed block carrying the upper dog.

F indicates the vertically-movable toothed block before mentioned, which is arranged in the grooved way C and is provided with guide-tongues, whereby it may be prevented from lateral displacement. The way in the standard is provided at its upper end with a stop-plate, $f$, so as to prevent the movable toothed block from being raised entirely out of the groove.

G indicates the upper dog, which is of the form substantially as shown, having its biting-point adapted to normally extend beyond the forward vertical edge of the standard, and its lower end is pivotally secured to the movable toothed block at a point, $g$, being provided near its upper end with a stud or handle, H, which extends laterally. To the face of this slide-block F we have secured a wear-plate, which has its upper end turned outwardly in hook form, so as to serve the additional function of a guide for the movements of the dog.

The upper end of the standard is provided in one of its sides at the top of the grooved way and in rear thereof with an inclined notch, K, which is designed to receive a pin, L, on the inner side of the upper dog, whereby when the latter has been thrown rearwardly it may be locked and held out of an operative position.

M indicates the lower dog, which is arranged in a suitable guide-way on the opposite side of the standard from the upper dog, and has its lower end extended horizontally and provided with a biting-point, as shown at h. This dog is provided along its length on its rear edge with a suitable number of teeth, as shown at i, for the engagement of the operating-lever, which latter is also toothed, and the upper end of the said dog extends above the upper edge of the standard, being confined therein by the covering-plate, so that the operator may grasp the said dog independent of the operating-lever and manipulate the same, so as to adjust it for the inequalities of the log, after which the lever can be brought into action and hold the said dog in the desired position.

N indicates the hand lever, which is enlarged at its lower end and pivoted, as shown at l, to the standard between the same and the covering-plate. This enlarged portion of the lever is also provided with an elongated slot, m, which is designed to come or normally register with the transverse slot or aperture in the standard A, so that the said lever may be loosely connected by means of the stud or pin b with the toothed slide-plate E on the opposite side of the standard, so that the movements of the said slide-plate may be controlled by that of the hand-lever.

It should be here observed that when the hand-lever has been thrown in one direction on its pivot, so as to have its teeth engage the teeth of the lower dog, M, it will cause the plate E simultaneously to engage the teeth of the movable block carrying the upper pivoted dog.

The covering-plate, which when in position forms an interspace between itself and the standard, is provided at its upper end with rearwardly-directed teeth, (better shown in Fig. 1 of the drawings arranged in the arc of a circle,) so as to engage suitable devices on the hand-lever for fixing the same at the desired position.

In the illustration the hand-lever is not shown as provided with any means for engaging the teeth at the upper edge of the covering-plate; but it is obvious that a lug or other ordinary means may be employed.

Having described our invention, what we claim is—

1. In a saw-mill dog, the combination, with a standard having ways on opposite sides for the passage of dogs, of a dog provided with engaging-teeth and a dog pivoted on a toothed slide-block, and suitable means of locking them to the standard, substantially as specified.

2. The combination, with the grooved standard, of the toothed slide-plate having inclined slots, a toothed slide-block adapted to be engaged by the said slide-plate, and a dog pivoted to the said block, substantially as specified.

3. The combination, with a standard having vertical guideways, of dogs arranged therein, the toothed slide-plate having inclined slots, and the operating hand-lever adapted to automatically engage both dogs and move them with relation to the standard, substantially as specified.

4. The combination, with a saw-mill dog, substantially as described, having the grooved guideways and provided with a notch, as K, of the toothed slide-block and the dog pivoted thereto and provided with a pin adapted to enter the notch of the standard, and the toothed slide-plate, substantially as specified.

In testimony whereof we affix our signatures in presence of two witnesses.

ORMANDO D. GORDON.
   JOSEPH C. LUCIA.

Witnesses:
 GEORGE A. PAYNE,
 P. J. COWLES.